United States Patent
Derville et al.

(10) Patent No.: US 12,034,885 B2
(45) Date of Patent: Jul. 9, 2024

(54) METHOD FOR PROCESSING A REQUEST FROM A COMMUNICATION TERMINAL

(71) Applicant: Orange, Issy-les-Moulineaux (FR)

(72) Inventors: Frank Derville, Châtillon (FR); François Caseau, Châtillon (FR); Paul Beardow, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/003,182

(22) PCT Filed: Jun. 22, 2021

(86) PCT No.: PCT/FR2021/051134
§ 371 (c)(1),
(2) Date: Dec. 23, 2022

(87) PCT Pub. No.: WO2021/260318
PCT Pub. Date: Dec. 30, 2021

(65) Prior Publication Data
US 2023/0262167 A1    Aug. 17, 2023

(30) Foreign Application Priority Data
Jun. 24, 2020   (FR) .................................... 2006592

(51) Int. Cl.
*H04M 3/523*    (2006.01)
*H04M 3/42*    (2006.01)

(52) U.S. Cl.
CPC ..... *H04M 3/5231* (2013.01); *H04M 3/42008* (2013.01); *H04M 3/42059* (2013.01)

(58) Field of Classification Search
None
See application file for complete search history.

(56) References Cited

U.S. PATENT DOCUMENTS

| | | | | |
|---|---|---|---|---|
| 5,703,943 A | * | 12/1997 | Otto | H04M 3/51 379/245 |
| 6,778,653 B1 | * | 8/2004 | Kallas | H04M 3/36 379/201.05 |

(Continued)

FOREIGN PATENT DOCUMENTS

EP    0768788 A2    4/1997

OTHER PUBLICATIONS

International Search Report dated Sep. 9, 2021 for corresponding International Application No. PCT/FR2021/051134, filed Jun. 22, 2021.

(Continued)

*Primary Examiner* — Harry S Hong
(74) *Attorney, Agent, or Firm* — David D. Brush; Westman, Champlin and Koehler, P.A.

(57) ABSTRACT

A method for processing a request from a first communication terminal, intended to establish communication with a second communication terminal via a communications management platform. The method includes identifying the second communication terminal from among a set of communication terminals associated with the communications management platform. The method furthermore includes: assigning, to the first communication terminal, at least one identifier associated with the identified second communication terminal, allowing the first communication terminal to establish communication with the second communication terminal; and transmitting, to the first communication terminal, a message containing the at least one assigned identifier.

12 Claims, 3 Drawing Sheets

(56) References Cited

U.S. PATENT DOCUMENTS

| | | | |
|---|---|---|---|
| 8,413,058 B1 * | 4/2013 | Lewis | G06F 3/04817 |
| | | | 715/764 |
| 2016/0309030 A1 | 10/2016 | Tietsch | |
| 2021/0144254 A1 * | 5/2021 | Deole | H04M 3/563 |
| 2023/0291837 A1 * | 9/2023 | DiMaria | H04M 3/5231 |
| | | | 379/209.01 |

OTHER PUBLICATIONS

Written Opinion of the International Searching Authority dated Sep. 9, 2021 for corresponding International Application No. PCT/FR2021/051134, filed Jun. 22, 2021.

English translation of the Written Opinion of the International Searching Authority dated Sep. 21, 2021 for corresponding International Application No. PCT/FR2021/051134, filed Jun. 22, 2021.

* cited by examiner

METHOD FOR PROCESSING A REQUEST FROM A COMMUNICATION TERMINAL

CROSS-REFERENCE TO RELATED APPLICATIONS

This Application is a Section 371 National Stage Application of International Application No. PCT/FR2021/051134, filed Jun. 22, 2021, which is incorporated herein by reference in its entirety and published as WO 2021260318 on Dec. 30, 2021, not in English.

FIELD OF THE DISCLOSURE

The present invention relates to a method for processing a communication request from a communication terminal. The request is intended to establish communication with a second communication terminal via a communication management platform.

It further relates to a device for processing a request and a communication management platform carrying out the processing method.

The invention applies, in particular, to platforms used for managing customers or customer services, for example for the provision of services.

BACKGROUND OF THE DISCLOSURE

Some companies, such as telephony operators, provide their customers or prospective customers with customer services. When a customer, or prospective customer, calls the customer service using a call identifier or generic call number, this call is received in a platform intended for managing or processing communications. In particular, the purpose of this platform is to put the calling customer in contact with a customer service resource able to respond to his request.

The customer service resource can be a person responsible for customer relations (known as an operator or telephone adviser), or a voice server providing the customer with requested information.

Generally speaking, the communication management platform selects a suitable operator to respond to the customer's request, depending, for example, on information relating to the service requested by the customer.

Some communication management platforms use an interactive voice response (IVR) server for this purpose. The communication management platform selects an operator station depending on information from the customer, corresponding, for example, to actions of the customer on buttons of his communication terminal or voice information given by the customer.

In other communication management platforms, an operator answering the customer's call asks for the service required by the customer and routes the call accordingly to the most suitable station for processing his request.

A customer service thus takes the form of a platform intended for the management or processing of the communication requests received from customer communication terminals. These communication requests are intended to establish communication with a communication terminal associated with the communication management platform.

The communication management platform receiving a communication request from a first communication terminal identifies a second communication terminal associated with the management platform, and puts the first communication terminal in contact with the second communication terminal.

In the case of a customer service, the second communication terminal generally corresponds to a station of a person responsible for customer relations. The communication management platform therefore puts the customer and the operator in contact with one another.

Sometimes, the service requested by a customer cannot be processed by means of a single call to the customer service. This is the case in complex situations, such as a relocation or the declaration and processing of an accident claim, etc.

Yet, each time that the customer calls the customer service, albeit concerning the same service, the platform assigns a different operator station to the customer.

Thus, in those situations in which the customer has to contact the customer service on several occasions concerning the same service, the customer service lacks efficiency in providing the service and the customer experience is not optimal.

SUMMARY

The present invention aims to improve this situation.

For this purpose, the invention focuses on a method for processing a communication request from a first communication terminal, the request being intended to establish communication with a second communication terminal via a communication management platform, the method comprising identifying the second communication terminal from among a set of communication terminals associated with the communication management platform.

According to the invention, the processing method further comprises:

assigning, to said first communication terminal, at least one identifier associated with the identified second communication terminal allowing the first terminal to establish communication with the second communication terminal using said identifier, and transmitting, to the first communication terminal, a message comprising said at least one assigned identifier.

The first communication terminal receiving said at least one identifier which has been assigned to it can therefore use this identifier to establish subsequent communications with the second communication terminal without the identification of the second terminal having to be performed again. The customer can therefore contact the agent of the second communication terminal using the received identifier.

The assignment of the identifier to the first communication terminal allows communication to be established between the first and second communication terminals. A third communication terminal would not be able to establish communication with the second communication terminal using the identifier assigned to the first communication terminal. In other words, due to the assignment of the identifier to the first communication terminal, the identifier can be used only by the first communication terminal to establish communication with the second communication terminal.

These arrangements ensure that the identifier assigned to the first communication terminal cannot be used by other users to contact the user of the second communication terminal.

It should be noted that said at least one identifier assigned to the first communication terminal is an identifier generated for the identified second communication terminal or, in other words, an identifier associated with the second communication terminal.

Said at least one identifier can therefore be regarded as being associated with the second communication terminal and with the first communication terminal.

The processing method is carried out by the communication management platform following the reception of a communication request from the first communication terminal. This communication request is intended to establish communication with a communication terminal associated with the communication management platform in order, for example, to request a service provision.

When the first terminal establishes communication once more with the second communication terminal via the management platform using the identifier received from the management platform, the operator or user of the second terminal is aware of the service requested by the user of the first communication terminal. The provision of the service requested by the user of the first communication terminal is therefore efficient and the customer experience of the user is positive. It should be noted that the user of the first communication terminal will be put in contact directly with the user of the second communication terminal and will not have to repeat the request for the service to the user of the second communication terminal (for example an operator).

The communication management platforms can be used for different purposes. The communication management platform can be, for example, a customer service platform of a company, such as a telephony operator, an insurance company, a purchasing or reservation service, etc. The services requested by the users of the communication terminals can therefore be different. A service can be any request from a user of a communication terminal, the user generally being a customer of the company providing a communication management platform. The service can be, for example, the fixing of a problem encountered by the customer, the reservation of a journey, etc.

According to one characteristic, said at least one identifier is a call identifier or an email address.

The first communication terminal thus receives a call identifier and/or an email address from the communication platform allowing it to establish communication with the second communication terminal.

A user of the first communication terminal can thus establish communications with a user (such as a customer service agent) of the second communication terminal using the call identifier and/or the email address received from the communication management platform.

In one embodiment, the message transmitted to the first terminal comprises a hypertext link to a resource in a network, this resource enabling an email message to be sent to the email address assigned to the first communication terminal.

The message can comprise, for example, a hypertext link to a web page hosted by a web server, for example the web page of the company providing a customer service via the communication management platform.

The user of the first communication terminal can access the resource via the hypertext link, and uses this resource to establish communication with the second terminal. The resource is configured to send an email message, the content of which is composed by the user of the first communication terminal, to the email address assigned to the first communication terminal by the communication management platform.

According to one characteristic, the processing method further comprises establishing communication between the first communication terminal and the second communication terminal following the reception of the communication request.

As well as receiving the call identifier and/or the email address assigned to it by the communication management platform, the first communication terminal is thus put in contact with the identified second communication terminal.

In one embodiment, the second communication terminal can be identified on the basis of information relating to the first communication terminal.

The information relating to the first communication terminal is obtained, for example, by an interactive voice response server receiving the request from the first communication terminal.

According to one characteristic, assigning the identifier to the first communication terminal comprises storing said identifier and the identifier of the first communication terminal, this storage enabling said identifier to be associated with the identifier of the first communication terminal.

The processing method can comprise, for example, recording the identifier of the first communication terminal and the identifier assigned to the first communication terminal in a database, the two identifiers being recorded in association with one another.

According to one characteristic, the processing method further comprises recording a validity variable in the database, in association with the identifier of the first communication terminal and the identifier assigned to the first communication terminal, indicating whether the assigned identifier is valid.

The validity variable can have a first value representing the validity of the assigned identifier, and a second value representing the invalidity of the assigned identifier.

The assigned identifier is valid, for example, if the service requested by the user of the first communication terminal is currently being processed. The identifier is not valid if the requested service has been provided.

The assigned identifier can therefore be used as long as the requested service is currently being processed. In other words, the first communication terminal can establish communication with the second communication terminal as long as the requested service is currently being processed. Once the user of the first terminal has obtained the requested service, the first communication terminal can no longer establish communication with the second communication terminal using the identifier assigned to it.

According to a different embodiment, the processing method further comprises generating a validity time period during which said at least one assigned identifier can be used by the first communication terminal to establish communication with the second communication terminal.

In this embodiment, the assigned identifier is not valid once the time period has expired.

The value of the validity variable indicating whether the assigned identifier is valid is updated depending on the expiration of this validity time period.

According to one characteristic, the processing method furthermore comprises:
receiving an additional request from the first terminal intended to establish communication with the previously identified second communication terminal,
checking the validity of the previously recorded assigned identifier in the database, and
establishing communication between the first communication terminal and the second communication terminal if the assigned identifier is valid.

Communication between the communication terminals is therefore established or not depending on the result of the identifier validity check.

Communication between the communication terminals is established only if the identifier is valid, for example if the value of the validity variable indicates that the requested service is currently being processed, i.e. it is not finalized.

Checking the validity of the assigned identifier comprises, for example, checking the validity variable associated with the previously recorded assigned identifier, communication between the first communication terminal and the second communication terminal being established if the validity variable indicates that the assigned identifier is valid.

According to one characteristic, if the validity variable indicates that the assigned identifier is not valid, the processing method further comprises generating a message indicating that the assigned identifier is not valid, and transmitting the message to the first communication terminal.

If the requested service has been provided, when the communication management platform receives an additional request and, in the step of checking the validity of the identifier, the assigned identifier is not valid, the establishment of communication with the second terminal is refused and the first communication terminal is informed thereof.

On receiving this information message, the user realizes that he must resend a communication request to the communication management platform using the identifier allowing him to contact the communication management platform.

According to a second aspect, the present invention relates to a device for processing a communication request from a first communication terminal, intended to establish communication with a second communication terminal via a communication management platform, the processing device comprising an identification module for identifying the second communication terminal from among a set of communication terminals associated with the communication management platform.

According to the invention, the processing device furthermore comprises:
- an assignment module for assigning, to the first communication terminal, at least one identifier associated with the identified second communication terminal allowing the first communication terminal to establish communication with the second communication terminal using said identifier, and
- a transmission module for transmitting, to the first communication terminal, a message comprising said at least one assigned identifier.

According to one characteristic, the processing device further comprises a communication module configured to establish communication between the first communication terminal and the second communication terminal.

According to one characteristic, the processing device further comprises a generation module for generating said at least one identifier associated with the identified second communication terminal, the generated identifier being assigned to said first communication terminal.

According to one characteristic, the processing device is configured to record the identifier of the first communication terminal and the assigned identifier in a database, the two identifiers being recorded in association with one another.

According to one characteristic, the processing device is further configured to record a validity variable in the database, in association with the identifier of the first communication terminal and the assigned identifier, indicating whether the assigned identifier is valid.

According to one characteristic, the processing device further comprises a checking module configured to check in the database whether the previously recorded assigned identifier is valid, and in which the communication module is further configured to establish communication between the first communication terminal and the second communication terminal if the assigned identifier is valid.

According to one characteristic, the processing device further comprises a generation module for generating a message indicating that the assigned identifier is not valid, and a transmission module for transmitting the message to the first communication terminal.

The characteristics of the processing method and the device set out below can be taken in isolation or in combination with one another.

According to a third aspect, the present invention relates to a communication management platform comprising a processing device according to the invention.

According to one characteristic, the communication management platform comprises an interactive voice response server.

According to a fourth aspect, the present invention relates to a computer program comprising a sequence of instructions for carrying out the processing method according to the invention when it is loaded and executed by a processor.

According to a fifth aspect, the present invention relates to a computer-readable information medium on which a computer program is recorded, said program comprising a sequence of instructions for carrying out the processing method according to the invention when it is loaded and executed by a processor.

The processing device, the communication management platform, the computer program and the information medium have characteristics and advantages similar to those previously described in relation to the processing method.

Other specific features and advantages of the invention will also be detailed in the description below.

BRIEF DESCRIPTION OF THE DRAWINGS

In the attached drawings, given as non-limiting examples.

DETAILED DESCRIPTION OF ILLUSTRATIVE EMBODIMENTS

The proposed technique applies, in particular, to customer service platforms in which users are put in touch via the platform with operators or telephone advisers.

Figure 1:
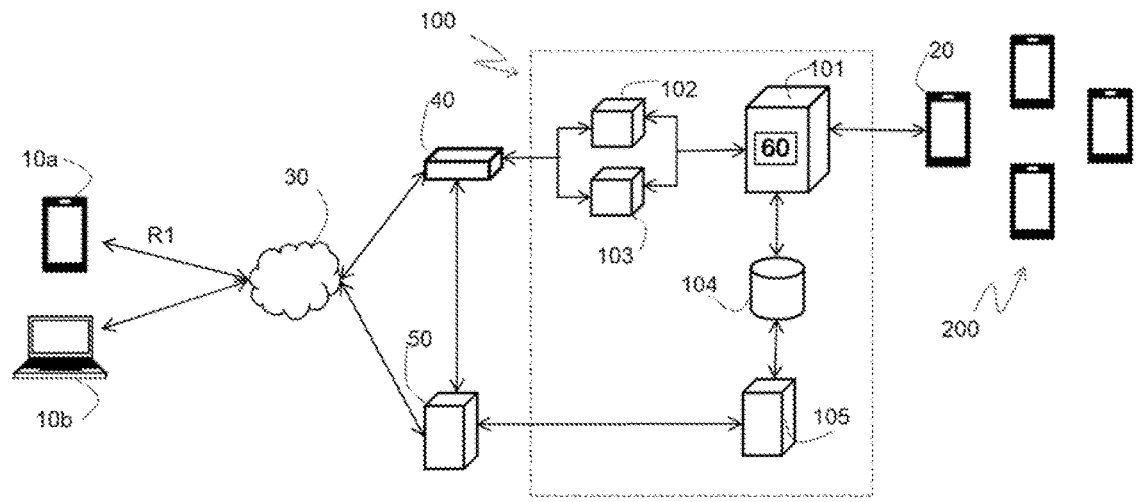
FIG. 1 shows a communication management platform according to one embodiment.

FIG. 1 shows a communication management platform 100 according to one embodiment A first communication terminal 10a sends a communication request R1 to the communication management platform 100 via a gateway 40. The communication request R1 is intended to establish communication with a second communication terminal 20 via the communication management platform 100. The second communication terminal 20 is part of a set of communication terminals 200 associated with the communication management platform 100.

By way of illustration, each communication terminal of this set 200 corresponds to an operator station of a customer service.

In one embodiment, the communication request R1 from the first communication terminal 10a is a SIP (Session Initiation Protocol) request. Other protocols can obviously be used for the communication between the first communication terminal and the communication management platform, for example using DTMF (Dual-Tone Multi-Frequency), SDMF (Subscriber Main Distributing Frame), MDMF (Multiple Data Message Format) or other technologies.

A communication terminal can be understood to mean any device capable of establishing communication with other communication devices or terminals 10a, 10b, 20 via a communication network 30.

The communication terminal 10a, 10b, 20 can be a mobile communication terminal, such as a cell phone, for example a smartphone, a tablet or a portable computer, a desktop computer or a household appliance capable of setting up a connection to another communication terminal 10a, 10b, 20 via a communication network 30. The communication terminal 10a, 10b, 20 can also be a fixed telephony terminal.

In the embodiment shown, the gateway 40 is a gateway providing access to the communication management platform 100 and access from the platform to communication terminals 10a, 10b. The gateway 40 is, for example, in a platform of an operator or can be a residential gateway.

In one embodiment, such as the embodiment shown, the communication management platform 100 comprises an interactive voice response or IVR server 102.

In this embodiment, when the platform 100 receives a communication request R1, it is received, in particular, by the interactive voice response server 102. The interactive voice response server 102 engages in dialogue with the user of the first communication terminal 10a in order to obtain information relating to the first communication terminal 10a.

In the case of a communication management platform used in a customer service, the interactive voice response server 102 obtains, for example, information relating to the service requested by the user of the first communication terminal or customer.

The interactive voice response server 102 uses the obtained information to identify the second communication terminal 10b from among the set of communication terminals 200 associated with the communication management platform 100.

The operation of an interactive voice response server is known to the person skilled in the art and will not be described in detail here.

As a non-limiting example, if the communication management platform is the customer service of a telephony operator, the user can indicate, for example, by means of a voice message or by an action on the keyboard/keypad of the first communication terminal, whether his request relates to a mobile telephony subscription, an Internet subscription, or whether the user is a private or business customer, or a prospective customer, etc.

The communication management platform 100 can obviously be intended for other services, for example it can be used as a reservation service, for example for an airline or railroad company, as a purchasing service or other service.

The interactive voice response server 102 further obtains the identifier of the first communication terminal 10a. The identifier of the first communication terminal 10a is, for example, a call identifier. This call identifier is a unique identifier associated with the first communication terminal 10a enabling identification of the communication terminal 10a in a mobile network of an operator to which the user of the first communication terminal 10a, 10b subscribes. The call identifier is, for example, an MSISDN (Mobile Station International Subscriber Directory Number) identifier corresponding uniquely to the SIM (Subscriber Identity Module) card of the communication terminal 10a, 10b.

The communication management platform 100 further comprises an alias generation platform 101. This alias generation platform 101 is configured to receive the obtained information relating to the first communication terminal 10a from the interactive voice response server 102 and/or the set of agents 103. The alias generation platform 101 is configured to identify, depending on the obtained information relating to the first communication terminal 10a, a second communication terminal 20 whose user can respond to the request from the user of the first communication terminal 10a.

The alias generation platform 101 is further configured to generate at least one identifier associated with the identified second communication terminal 20 and assign it to the first communication terminal 10a, 10b. The generated identifier assigned to the first communication terminal 10a, 10b can be used subsequently by the first communication terminal 10a, 10b to establish communication with the second communication terminal 20.

Said at least one generated identifier assigned to the first communication terminal can be an email address.

As a non-limiting example, the email address comprises the call identifier and the name of the company providing the customer service. The email address can, for example, take the following forms:

"TerminalCallIdentifier"@CompanyName.com"
"TerminalCallIdentifier"–
   "CustomerServiceNum"@CompanyName.com"
"CustomerServiceNum"–
   "TerminalCallIdentifier"@CompanyName.com"
"TerminalCallIdentifier"-Service
   Type@CompanyName.com"
"TerminalCallIdentifier"-"CustomerServiceNum"-Service Type @CompanyName.com"
"CustomerServiceNum"–"TerminalCallIdentifier"-Service Type @CompanyName.com"

In the embodiment described, the communication management platform 100 generates a call identifier and an email address. The first communication terminal can therefore establish communication subsequently with the second communication terminal 20 via different technical means.

In other embodiments, the communication management platform 100 generates either a call identifier or an email address.

In the embodiment described, the communication management platform 100 further comprises a set of agent or operator stations 103. The agent stations 103 can obtain information relating to the first communication terminal 10a instead of or in addition to the interactive voice response server 102. An agent station can therefore be put in touch with the first communication terminal 10a in order, for example, to respond to the communication request received from the first communication terminal 10a.

In the embodiment described, the alias generation platform 101 is further configured to transmit a communication request to the second communication terminal 20 intended to establish communication between the first communication terminal 10a and the second communication terminal 20.

The alias generation platform 101 is further configured to transmit a message to the first communication terminal 10a comprising the identifier assigned to it.

The communication management platform 100 further comprises a database 104 in which the identifier of the first communication terminal 10a is recorded in association with the generated identifier assigned to the first communication terminal 10a, 10b. As will be described later, a validity variable indicating whether the assigned identifier is valid or invalid is also recorded in the database 104 for each pair formed by the identifier of the first communication terminal 10a and the identifier generated and assigned to the first communication terminal by the communication management platform 100.

In other embodiments, the database is not part of the communication management platform 100 and is associated with the communication management platform 100.

In the embodiment described, the communication management platform 100 further comprises a messaging server 105 intended to receive email messages from the first communication terminal 10a, 10b. The messaging server 105 can receive email or SMS (Short Message Service) messages.

In one embodiment, the email messages can be sent to the messaging server 105 of the communication management platform 100 via a web server 50.

Figure 2:
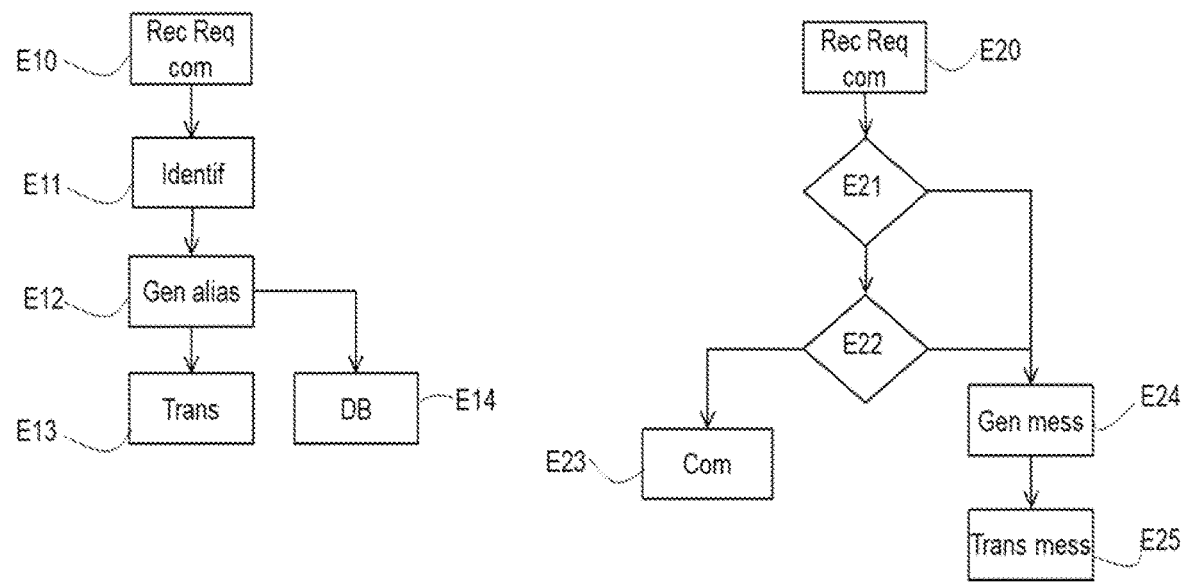
FIG. 2 shows the steps of the processing method according to one embodiment.

FIG. 2 shows the steps of the processing method according to one embodiment. This method is carried out by a communication management platform 100 as shown in FIG. 1.

The processing method is carried out following the reception E10 of the communication request R1 from the first communication terminal 10a, 10b. This communication request R1 is intended to establish communication with a second communication terminal 20.

When the communication management platform 100 receives the communication request R1 from the first communication terminal 10, the second communication terminal 20 is identified E11 from among a set of communication terminals 200 associated with the communication management platform 100.

As indicated below, the identification is implemented depending on information obtained from the first communication terminal 10a, 10b. In order to perform the identification of the second terminal 20, the communication management platform 100 uses databases with information specific to the communication management platform, for example the database 104. The performance of the identification of the second terminal is known to the person skilled in the art and does not need to be described in detail here.

Once the communication management platform 100 has identified the second communication terminal 20, an identifier associated with the identified second communication terminal 20 is generated E12 and assigned E14 to the first communication terminal 10a, 10b.

A message comprising the identifier generated and assigned to the first communication terminal is then transmitted E13 to the first communication terminal 10a, 10b.

As indicated below, the identifier assigned to the first communication terminals can be a call identifier and/or an email address.

In one embodiment, the message transmitted to the first terminal comprises a hypertext link to a resource in the communication network 30, this resource enabling an email message to be sent to the generated email address.

The message can comprise, for example, a hypertext link to a web page hosted by a web server 50, for example the web page of the company providing a customer service via the communication management platform 100.

The user of the first communication terminal 10a, 10b can access the resource via the hypertext link and can use this resource to establish communication with the second communication terminal 20. The resource is configured to send an email message, the content of which is composed by the user of the first communication terminal 10a, 10b, to the email address generated by the communication management platform 100.

When, for example, the user of the first terminal 10a, 10b selects the hypertext link in the message received from the communication management platform 100, a web page is loaded on which the user can compose a message intended for the user of the second communication terminal 20 or operator. The email address generated by the communication management platform 100 is prefilled in the recipient field of the message.

In this embodiment, it should be noted that the message sent by the communication management platform 100 to the first communication terminal 10a, 10b contains the hypertext link instead of the email address.

In the embodiment described, the generated identifier is recorded E14 in the database 104. In one embodiment, assigning E14 the identifier to the first communication terminal in fact comprises storing said identifier (the identifier generated and assigned to the first communication terminal) and the identifier of the first communication terminal, this storage enabling said identifier to be associated with the identifier of the first communication terminal. In the embodiment described, the identifier of the first communication terminal and the identifier assigned to the first communication terminal are recorded in a database, the two identifiers being recorded in association with one another.

When the management platform receives E20 an additional request R2 from the first communication terminal 10a, 10b intended to set up a connection to the previously identified second communication terminal 20, the management platform 100 carries out checks E21, E22 to decide whether the first communication terminal 10a, 10b can be put in contact with the second communication terminal 20. The validity of the identifier assigned to the first communication terminal is a checked in these checks E21, E22.

An additional request R2 is understood to mean a request received after the first communication request R1 and after the generation of an identifier associated with the second communication terminal 20 and with the first communication terminal 10a, 10b.

It should be noted that the identifier generated by the communication management platform 100 is associated not only with the second communication terminal 20 but also with the first communication terminal 10a, 10b.

An identifier is regarded as valid if it can be used or, in other words, if the first communication terminal 10a, 10b can establish communication with the second communication terminal 20 by using this identifier.

Conversely, an identifier is regarded as invalid if it cannot be used by the first communication terminal 10a, 10b to establish communication with the second communication terminal 20.

In one embodiment, in order to check whether the identifier is valid, a first check is carried out E21 intended to check whether the call identifier of the first communication terminal 10a, 10b is recorded in the database 104 of the management platform 100 (or associated with the management platform 100). If the identifier is present in the database 104 and is associated with the second communication terminal 20, the method comprises a second check E22 intended to check the value of the validity variable associated with the generated identifier and with the call identifier of the first communication terminal 10a, 10b.

In one embodiment, the validity variable can have two values, a first value indicating that the identifier is valid, and a second value indicating that the identifier is not valid.

The identifier is valid as long as the service requested by the user of the first communication terminal 10a, 10b has not been provided. In other words, the validity variable has the first value as long as the service has not been provided. Once the service has been provided, the validity variable has the second value, the validity variable indicating that the identifier is no longer valid.

In one embodiment, during the recording of the call identifier of the first communication terminal 10a, 10b and the assigned identifier, the validity variable has the first value, this first value being the default value of the validity variable.

When the service requested by the user of the first communication terminal 10a, 10b is provided, the value of the validity variable is modified so that it indicates that the assigned identifier is no longer valid. This modification can be carried out by an agent of the set of agents 103, such as the agent processing the call or the agent using the second communication terminal.

According to a different embodiment, the processing method further comprises generating a validity time period during which the assigned identifier can be used by the first communication terminal 10a, 10b to establish communication with the second communication terminal 20.

In this embodiment, the assigned identifier is not valid once the time period has expired.

The value of the validity variable indicating whether the assigned identifier is valid is updated depending on the expiration of this validity time period. The value of variable thus indicates that the assigned identifier is valid as long as the validity time period has not expired. Conversely, the value of the variable indicates that the assigned identifier is no longer valid once the validity time period has expired.

If the validity variable has a value indicating that the assigned identifier is valid, communication is established E23 between the first communication terminal 10a, 10b and the second communication terminal 20.

If the validity variable has a value indicating that the assigned identifier is not valid, a message indicating that the assigned identifier is not valid is generated E24 and transmitted E25 to the first communication terminal 10a, 10b.

The user of the first communication terminal 10a, 10b is thus informed of the invalidity of the previously received identifier.

The checks described above prevent the same operator from being contacted by communication terminals which have not previously been put in contact via the management platform concerning a service. Thanks to the invention, the user of the first terminal is thus prevented from giving the received identifier to another user to contact the operator who has been assigned to the first communication terminal. The user of the first terminal is further prevented from using the identifier assigned to the first communication terminal once the service is provided and the management platform 100 has responded to his request. In fact, in order to provide a new service, the user of the first terminal 10a, 10b must send a first communication request R1 to the management platform 100 in order to obtain a new identifier.

Furthermore, the management of the communication terminals 200 associated with the communication management platform 100 is provided by the platform itself and the communication terminals 200 are not contacted directly outside the communication platform 200. The management of the management platform is therefore optimal.

In one embodiment, the generated identifier assigned to the first communication terminal 10a, 10b is a secondary identifier or alias of the second communication terminal 20.

This secondary identifier or alias is assigned to the first communication terminal 10a, 10b during the validity time period.

In the embodiment described, this time period corresponds to the time period required for the provision of the service requested by the user of the first communication terminal 10a, 10b.

The first communication terminal 100 does not therefore receive the primary call identifier of the second communication terminal 20, but instead an alias call identifier.

In a different embodiment, the validity time period has a predefined value. The user of the first communication terminal can contact the second communication terminal during this predefined time period.

Figure 3:
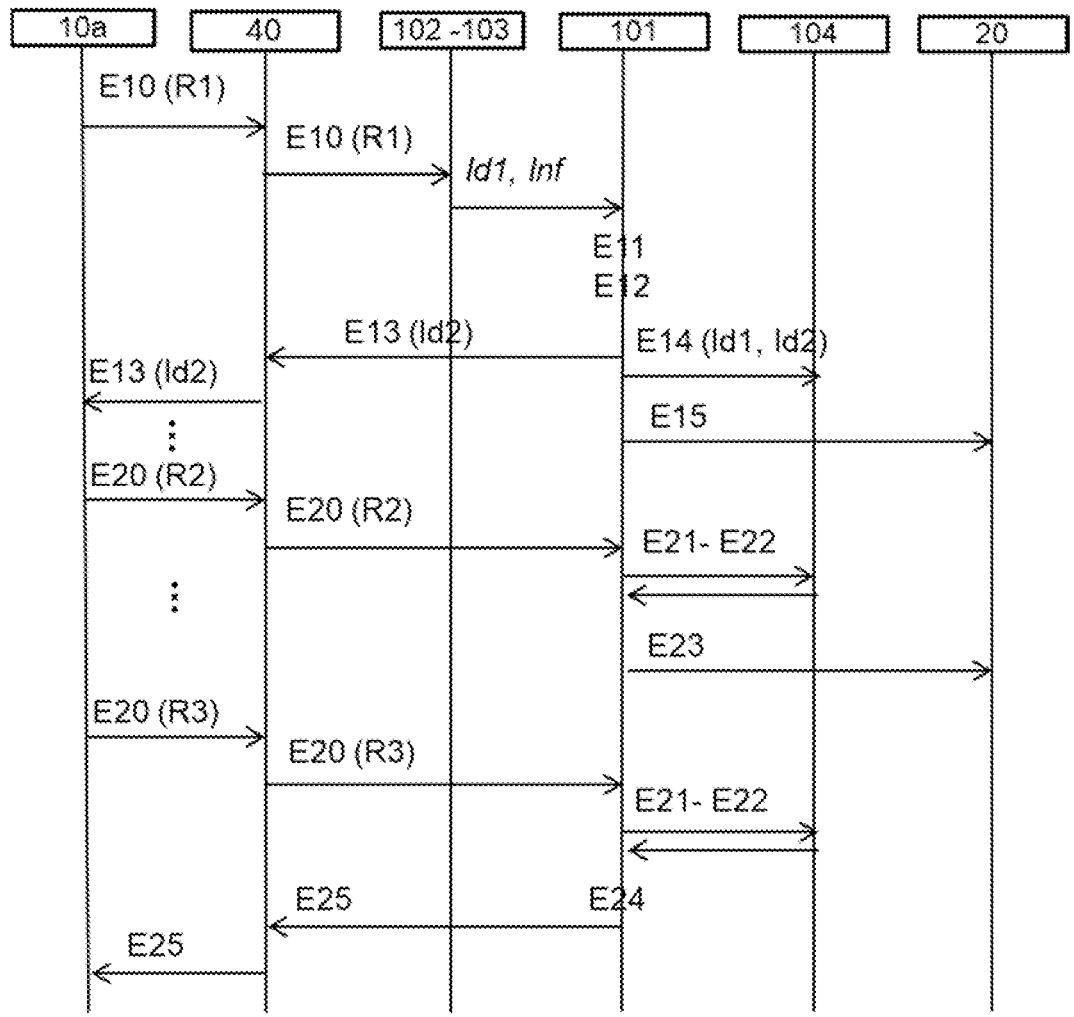
FIG. 3 shows the steps of the processing method according to one embodiment in the form of exchanges between entities.

FIG. 3 shows the steps of the processing method according to one embodiment in the form of exchanges between the different entities.

When the user of the first communication terminal 10a transmits a request R1 intended for the management platform 100, it is received by a gateway 40. The gateway 40 retransmits the request R1 to the management platform. In particular, the communication terminal 10a is put in contact with the interactive voice response server 102 and/or an operator of the set of operators 103.

As described below, the interactive voice response server 102 and/or the operator of the set of agents or operators 103 obtains information Inf relating to the service requested by the user of the first communication terminal 10a, 10b along with the call identifier Id1 of the first communication terminal 10a, 10b. This information Id1, Inf is sent to the alias platform 101, this platform identifying E11 a second communication terminal 20 from a set of communication terminals 200.

The alias generation platform 101 generates E12 an identifier associated with the second communication terminal 20. In particular, in this embodiment, the alias generation platform 101 assigns a secondary identifier or alias to the identified second communication terminal 20.

The generated identifier Id2 is transmitted E13 to the first communication terminal 10a via the gateway 40 and is assigned E14 to the first communication terminal 10a, 10b. In this embodiment, the identifier Id1 of the first communication terminal and the identifier Id2 generated and assigned E14 to the first communication terminal are recorded in the database 104 and the first communication terminal 10a, 10b is put in contact with the second communication terminal 20.

It should be noted that the identifier generated for the second communication terminal 20 or the identifier associated with the second communication terminal 20 is assigned to or associated with the first communication terminal 10, in particular to/with the identifier of the first communication terminal Id1.

When the first communication terminal 20 transmits a second request R2 intended to establish communication with the second terminal, the alias generation platform E101 consults the database 104 in order to check E21, E22 whether the identifier Id2 is valid. Communication between the first communication terminal 10a and the second communication terminal 20 is or is not established depending on the result of this check E21, E22. In the practical case shown, communication between the communication terminals is established E23.

In the case shown, following this communication E23, the service is considered to have been provided. Thus, when the communication terminal 10a transmits a further communication request R3, the alias generation platform 101 generates E24 a message indicating that the identifier Id2 is no longer valid and transmits E25 this message to the first communication terminal 10a.

Figure 4A:
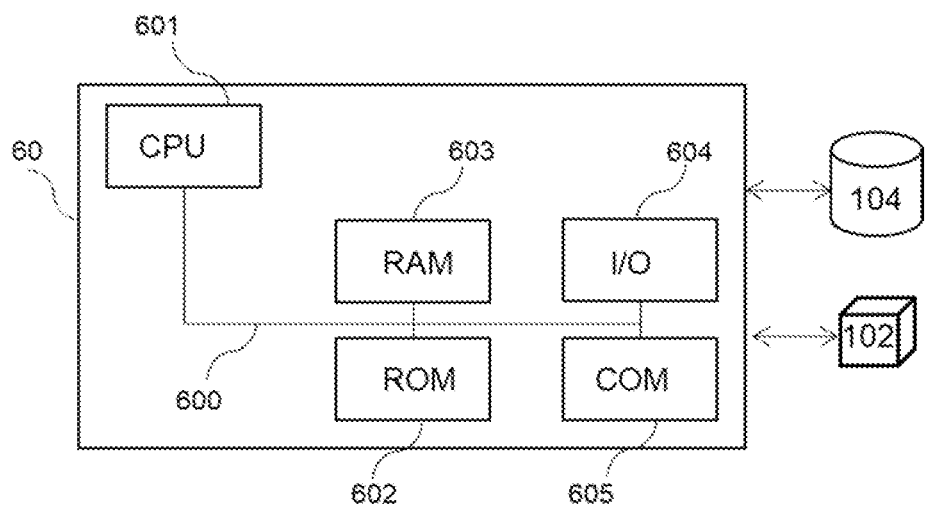
FIG. 4a shows a hardware architecture capable of carrying out the proposed processing method.

FIG. 4a shows schematically a hardware architecture of a processing device 60 capable of carrying out the proposed processing method.

In one embodiment, the processing device 60 can be integrated into the communication management platform 100, in particular into the alias generation platform 101.

The processing device 60 comprises a communication bus 600 to which the following are connected:
- a processing unit 601, denoted CPU (Central Processing Unit) in the figure, which can comprise one or more processors;
- a non-volatile memory 602, for example ROM (Read Only Memory), EEPROM (Electrically Erasable Read Only Memory) or a flash memory;
- a volatile memory 603 or RAM (Random Access Memory);
- an input/output interface 604, denoted I/O in the figure, for example keys or buttons, a screen, a keyboard/keypad, a mouse or other pointing device such as a touch screen or remote control allowing a user to interact with the processing device 20 via a graphical interface or human-machine interface; and
- a communication interface 605, denoted COM in the figure, suitable for exchanging data, for example, with a database 104 or an interactive voice response server 102.

The RAM memory 603 comprises registers suitable for recording variables and parameters created and modified during the execution of a computer program comprising instructions for carrying out the proposed processing method. The instruction codes of the program stored in the non-volatile memory 602 are loaded into the RAM memory 603 for the purpose of being executed by the processing unit CPU 601.

The non-volatile memory 602 is, for example, a rewritable memory such as an EEPROM or flash memory which can represent a medium within the meaning of the invention, i.e. capable of including a computer program comprising instructions for carrying out the proposed processing method. The rewritable memory can comprise, for example, a database containing call identifiers, generated secondary identifiers and validity variables of the identifier.

Figure 4B:
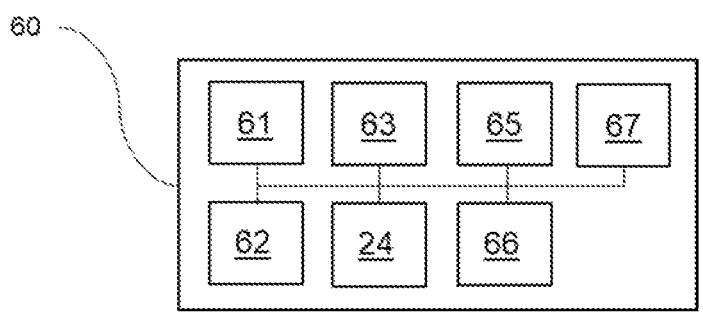
FIG. 4b is a functional representation of a management platform according to one embodiment.

This program defines, via its instructions, functional modules of the processing device 60 which are implemented and/or control the previously described hardware elements. FIG. 4b is a functional representation of a processing device 60 according to one embodiment.

These modules comprise, in particular:
- an identification module 61 for identifying the second communication terminal 20 from among a set of communication terminals 200 associated with the communication management platform 100,
- an assignment module 62 for assigning, to the first communication terminal, at least one identifier associated with the second communication terminal allowing the first communication terminal to establish communication with the second communication terminal,
- a generation module for generating said at least one identifier associated with the identified second communication terminal 20, and
- a transmission module 63 for transmitting a message comprising said assigned identifier Id2 to the first communication terminal 10a, 10b.

Depending on embodiments, the processing device 60 can further comprise:
- a communication module 64 configured to establish communication between the first communication terminal 10a, 10b and the second communication terminal 20,
- a checking module 65 configured to check in the database whether the previously recorded generated identifier Id2 is valid,
- a generation module 66 for generating a message indicating that the generated identifier Id2 is not valid, and
- a transmission module 67 for transmitting the message to the first communication terminal 10a, 10b.

The processing device 60 and, in particular, the assignment module 62 are further configured to record, in a database 104, the identifier of the first communication terminal 10a, 10b, the identifier generated and assigned to the first communication terminal, and a validity variable indicating whether the generated identifier Id2 assigned to the first communication terminal is valid.

The aforementioned modules and means are controlled by the processor of the processing unit 601. They can take the form of a program executable by a processor, or a hardware form such as an ASIC (Application-Specific Integrated Circuit), an SoC (System On Chip) or an electronic component having a programmable logic circuit, such as an FPGA (Field-Programmable Gate Array).

Although the present disclosure has been described with reference to one or more examples, workers skilled in the art will recognize that changes may be made in form and detail without departing from the scope of the disclosure and/or the appended claims.

The invention claimed is:

1. A processing method comprising:
processing a request received from a first communication terminal, to establish communication with a second communication terminal via a communication management platform, the processing comprising:
identifying the second communication terminal from among a set of communication terminals associated with the communication management platform;
assigning, to said first communication terminal, at least one identifier associated with the identified second communication terminal allowing the first terminal to establish communication with the second communication terminal; and
transmitting, to the first communication terminal, a message comprising said at least one assigned identifier.

2. The processing method as claimed in claim 1, in which said at least one assigned identifier is a call identifier or an email address.

3. The processing method as claimed in claim 2, in which the message transmitted to the first terminal comprises a hypertext link to a resource in a communication network, this resource enabling an email message to be sent to the assigned email address.

4. The processing method as claimed in claim 1, further comprising establishing communication between the first communication terminal and the second communication terminal.

5. The processing method as claimed in claim 1, in which the second communication terminal can be identified depending on information relating to the first communication terminal.

6. The processing method as claimed in claim 5, in which the information relating to the first communication terminal is obtained by an interactive voice response server receiving the request from the first communication terminal.

7. The processing method as claimed in claim 1, further comprising recording, in a database, the identifier of the first communication terminal and, in association with said identifier of the first communication terminal, recording the assigned identifier and a validity variable indicating whether the assigned identifier is valid.

8. The processing method as claimed in claim 7, further comprising:
    receiving an additional request from the first communication terminal, to establish communication with the previously identified second communication terminal,
    checking the validity of the previously recorded assigned identifier in the database, and
    establishing communication between the first communication terminal and the second communication terminal if the assigned identifier is valid.

9. The processing method as claimed in claim 8, further comprising generating a message indicating that the assigned identifier is not valid, and transmitting the message to the first communication terminal.

10. A processing device comprising:
    a processor; and
    a non-transitory computer readable medium comprising instructions stored thereon which when executed by the processor configure the processing device to process a request received from a first communication terminal, to establish communication with a second communication terminal via a communication management platform, the processing comprising:
    identifying the second communication terminal from among a set of communication terminals associated with the communication management platform;
    assigning, to the first communication terminal, at least one identifier associated with the identified second communication terminal allowing the first communication terminal to establish communication with the second communication terminal; and
    transmitting a message comprising said assigned identifier to the first communication terminal.

11. The processing device of claim 10, wherein the processing device is comprises in the communication management platform.

12. A non-transitory computer-readable information medium on which a computer program is recorded, said program comprising a sequence of instructions for carrying out a processing method when the sequence is loaded and executed by a processor, wherein the processing method comprises:
    processing a request received from a first communication terminal, to establish communication with a second communication terminal via a communication management platform, the processing comprising:
    identifying the second communication terminal from among a set of communication terminals associated with the communication management platform;
    assigning, to said first communication terminal, at least one identifier associated with the identified second communication terminal allowing the first terminal to establish communication with the second communication terminal; and
    transmitting, to the first communication terminal, a message comprising said at least one assigned identifier.

* * * * *